US012593156B2

(12) United States Patent
Ryu

(10) Patent No.: US 12,593,156 B2
(45) Date of Patent: Mar. 31, 2026

(54) SPEAKER ASSEMBLY

(71) Applicant: LG ELECTRONICS INC., Seoul (KR)

(72) Inventor: Jisung Ryu, Seoul (KR)

(73) Assignee: LG ELECTRONICS INC., Seoul (KR)

(*) Notice: Subject to any disclaimer, the term of this patent is extended or adjusted under 35 U.S.C. 154(b) by 148 days.

(21) Appl. No.: 18/579,214

(22) PCT Filed: Jul. 21, 2021

(86) PCT No.: PCT/KR2021/009440
§ 371 (c)(1),
(2) Date: Jan. 12, 2024

(87) PCT Pub. No.: WO2023/286903
PCT Pub. Date: Jan. 19, 2023

(65) Prior Publication Data

US 2025/0106540 A1 Mar. 27, 2025

(30) Foreign Application Priority Data

Jul. 16, 2021 (KR) ........................ 10-2021-0093216

(51) Int. Cl.
*H04R 7/12* (2006.01)
*H04R 1/02* (2006.01)
*H04R 7/18* (2006.01)

(52) U.S. Cl.
CPC ............... *H04R 1/028* (2013.01); *H04R 7/12* (2013.01); *H04R 7/18* (2013.01)

(58) Field of Classification Search
CPC . H04R 1/028; H04R 7/12; H04R 7/18; H04R 9/025; H04R 9/06; H04R 2307/023; F21V 33/0056
USPC .................................................. 381/413, 412
See application file for complete search history.

(56) References Cited

U.S. PATENT DOCUMENTS

| | | | | |
|---|---|---|---|---|
| 10,924,832 | B2 * | 2/2021 | Cook | H04R 9/022 |
| 2005/0232450 | A1 * | 10/2005 | Kobayashi | H04R 9/063 381/172 |
| 2006/0147081 | A1 | 7/2006 | Mango et al. | |

(Continued)

FOREIGN PATENT DOCUMENTS

| | | |
|---|---|---|
| JP | 2009141656 | 6/2009 |
| KR | 1020170028292 | 3/2017 |
| KR | 1020180057963 | 5/2018 |

OTHER PUBLICATIONS

PCT International Application No. PCT/KR2021/009440 International Search Report dated Apr. 12, 2022, 3 pages.

*Primary Examiner* — Jason Chan
(74) *Attorney, Agent, or Firm* — LEE, HONG, DEGERMAN, KANG & WAIMEY

(57) ABSTRACT

A speaker assembly is disclosed. The speaker assembly includes: a supporter that is elongated; an upper basket adjacent to one end of the supporter and coupled to the supporter; a lower basket adjacent to the other end of the supporter and coupled to the supporter; and a diaphragm disposed at an outside of the supporter between the upper basket and the lower basket, wherein one end and the other end of the diaphragm are coupled to the upper basket and the lower basket, respectively, so as to vibrate in a longitudinal direction of the supporter.

14 Claims, 7 Drawing Sheets

(56) References Cited

U.S. PATENT DOCUMENTS

| | | | | |
|---|---|---|---|---|
| 2010/0027833 | A1 * | 2/2010 | Takahashi ................ | H04R 9/06<br>381/412 |
| 2019/0387310 | A1 | 12/2019 | Sullivan et al. | |

* cited by examiner

[FIG. 1]
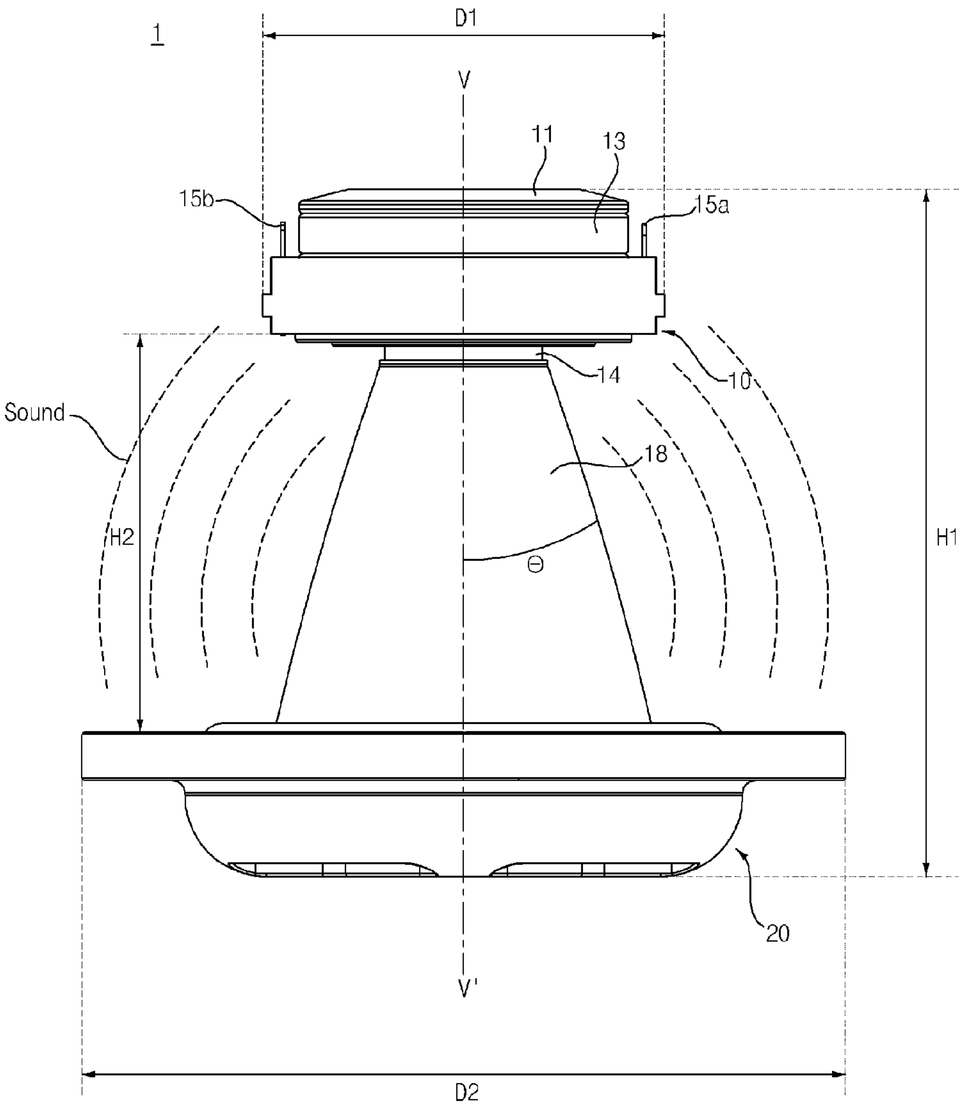

[FIG. 2]
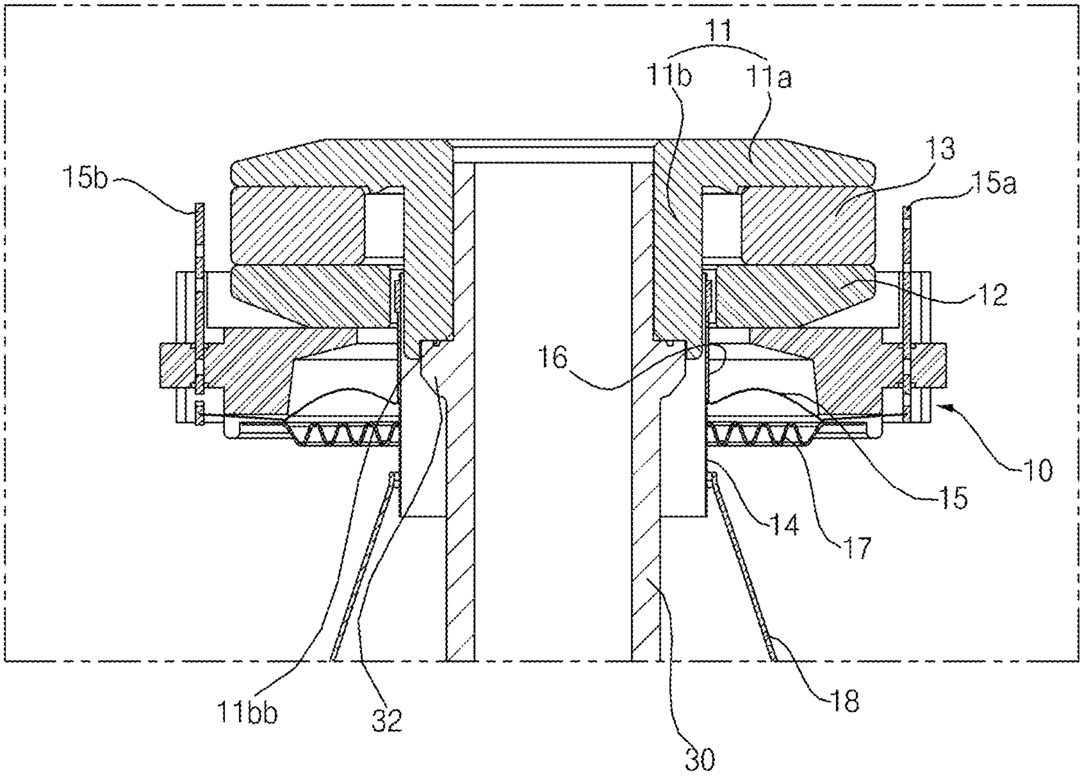

[FIG. 3]
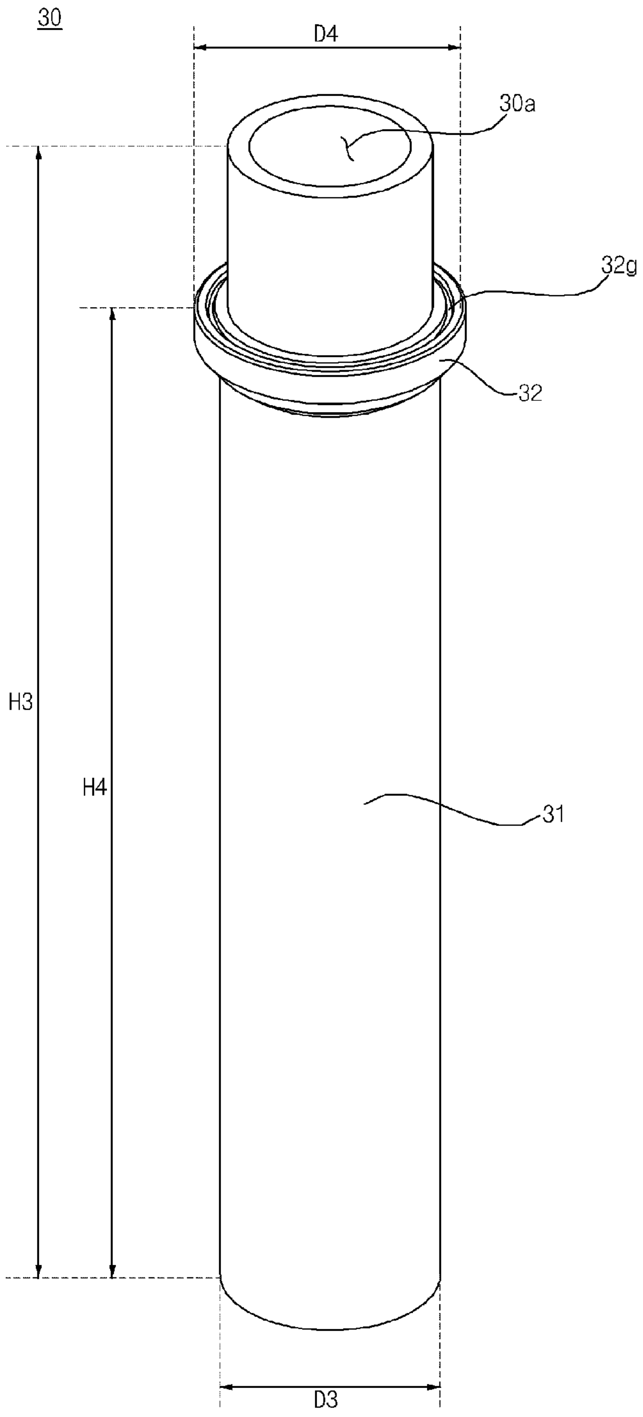

[FIG. 4]
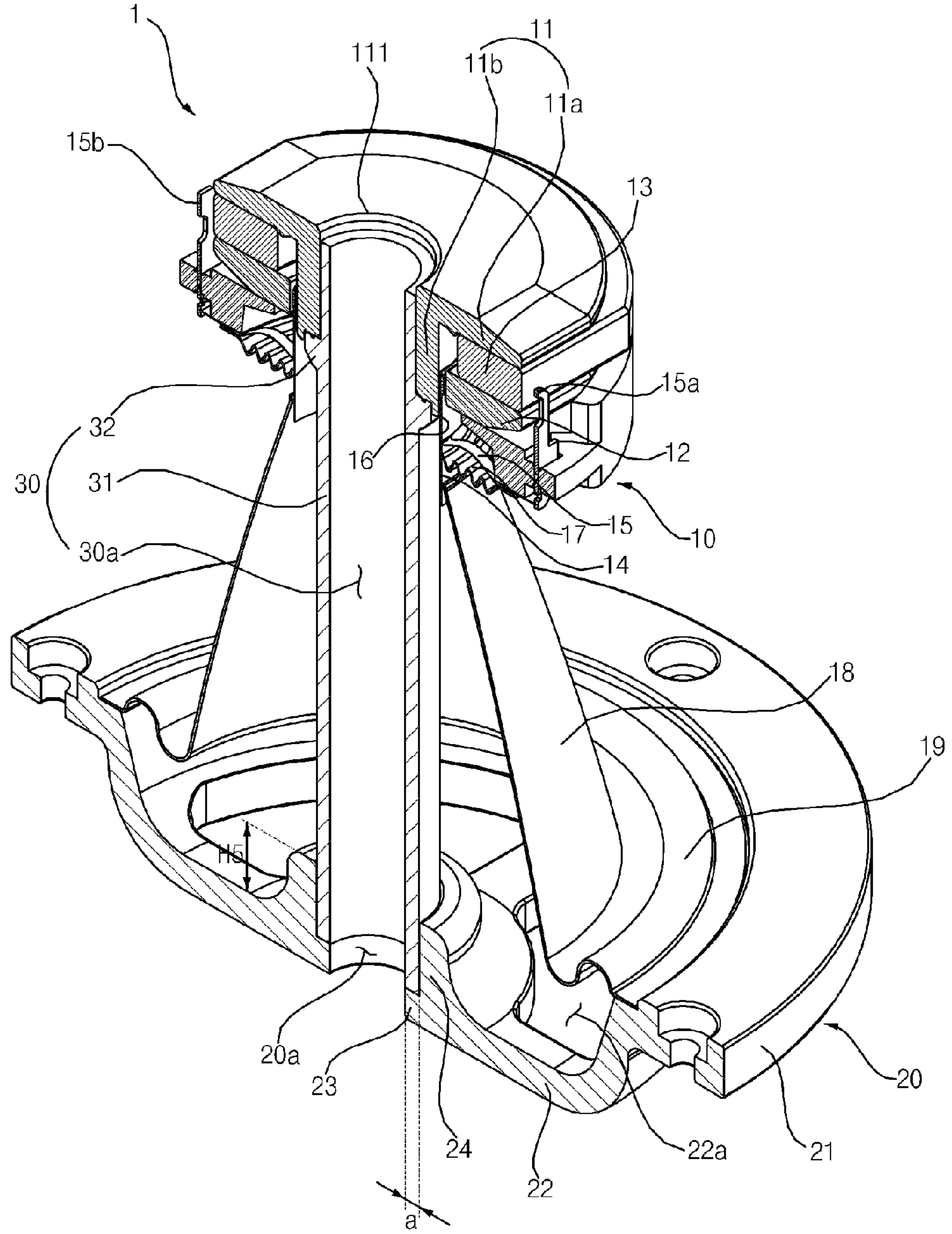

[FIG. 5]
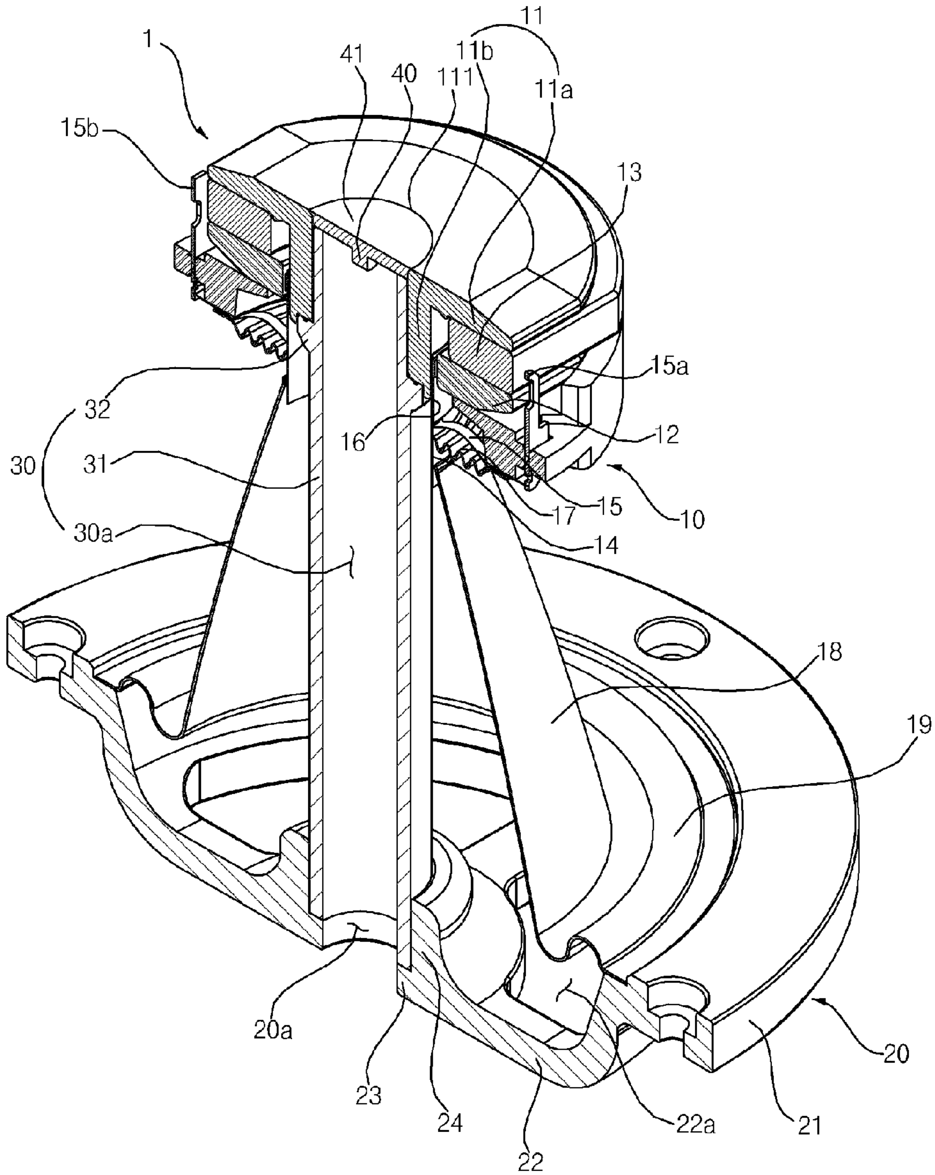

[FIG. 6]
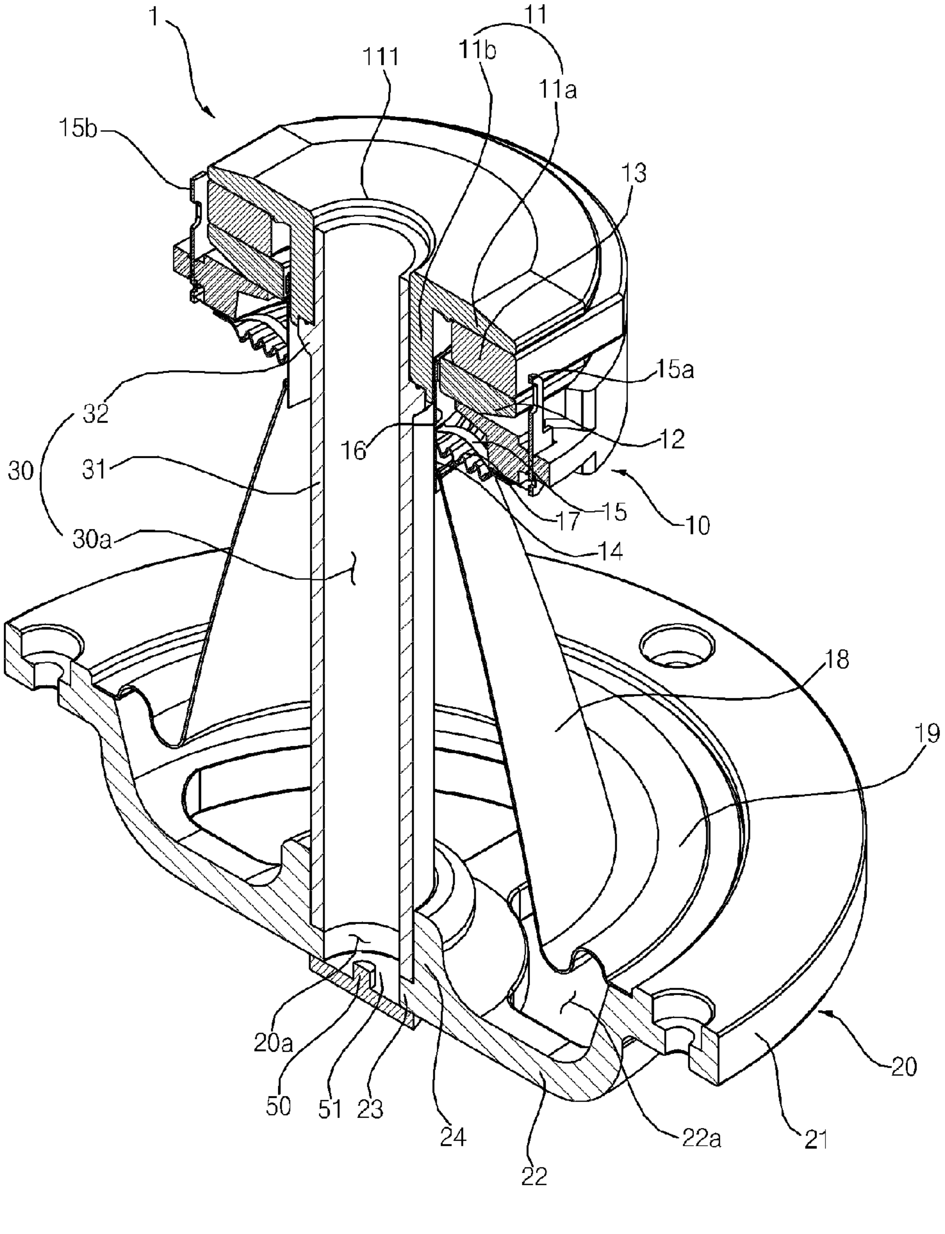

[FIG. 7]
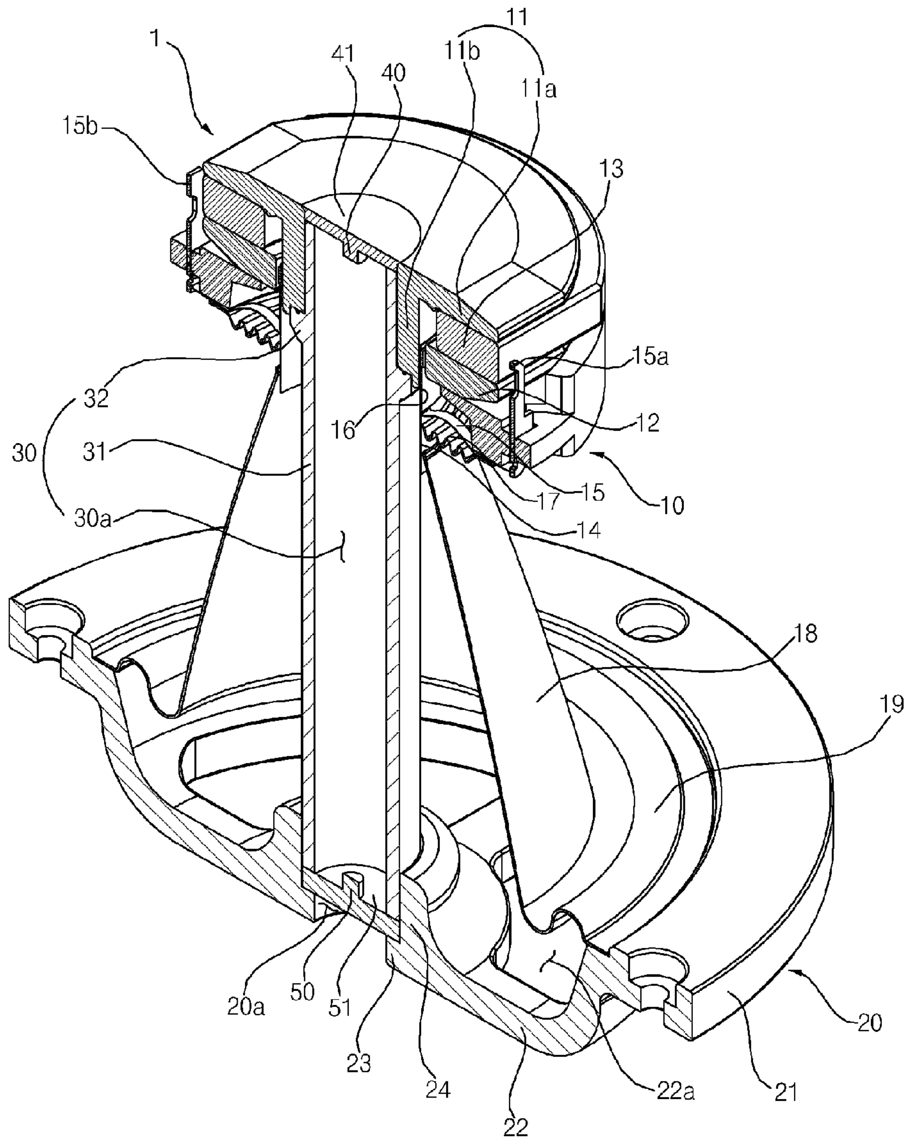

SPEAKER ASSEMBLY

CROSS-REFERENCE TO RELATED APPLICATION(S)

This application is the National Stage filing under 35 U.S.C. 371 of International Application No. PCT/KR2021/009440, filed on Jul. 21, 2021, which claims the benefit of earlier filing date and right of priority to Korean Application No. 10-2021-0093216, filed on Jul. 16, 2021, the contents of which are all incorporated by reference herein in their entirety.

TECHNICAL FIELD

The present disclosure relates to a speaker assembly.

BACKGROUND ART

A speaker is a transducer that converts an electrical audio signal into a sound wave, and can be used alone or connected to various devices such as a display device and an electronic device. Such a speaker may be subdivided into a woofer, a mid-range, and a tweeter according to frequency ranges.

Recently, a lot of research has been carried out to provide a certain quality of sound regardless of the listener's position relative to a speaker. In addition, various research has been conducted to seek ways to achieve various lighting effects by installing a lighting device in a speaker.

DISCLOSURE OF INVENTION

Technical Problem

It is an objective of the present disclosure to solve the above and other problems.

Another objective may be to provide a speaker assembly that can minimize sound radiation of a diaphragm of a speaker from being interfered by a component disposed at an outside of the diaphragm.

Another objective may be to provide a speaker assembly that can provide sound and lighting omnidirectionally in a horizontal direction.

Another objective may be to provide a speaker assembly that can achieve various lighting effects.

Solution to Problem

According to an aspect of the present disclosure, a speaker assembly includes: a supporter that is elongated; an upper basket adjacent to one end of the supporter and coupled to the supporter; a lower basket adjacent to the other end of the supporter and coupled to the supporter; and a diaphragm disposed at an outside of the supporter between the upper basket and the lower basket, wherein one end and the other end of the diaphragm are coupled to the upper basket and the lower basket, respectively, so as to vibrate in a longitudinal direction of the supporter.

Advantageous Effects of Invention

A speaker assembly according to the present disclosure has the following effects.

According to at least one of the embodiments of the present disclosure, it is possible to provide a speaker assembly capable of minimizing sound radiation of a diaphragm of a speaker from being interfered by a component disposed at an outside of the diaphragm.

According to at least one of the embodiments of the present disclosure, it is possible to provide a speaker assembly capable of providing sound and lighting omnidirectionally in a horizontal direction.

According to at least one of the embodiments of the present disclosure, it is possible to provide a speaker assembly capable of achieving various lighting effects.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

BRIEF DESCRIPTION OF DRAWINGS

FIGS. 1 to 7 illustrate examples of a speaker assembly according to embodiments of the present disclosure.

MODE FOR INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

It will be understood that although the terms "first", "second", etc. may be used herein to describe various elements, these elements should not be limited by these terms. These terms are only used to distinguish one element from another.

It will be understood that when a component is referred to as being "connected to" or "coupled to" another component, it may be directly connected to or coupled to another component, or intervening components may be present. In contrast, when a component is referred to as being "directly connected to" or "directly coupled to" another component, there are no intervening components present.

As used herein, a singular representation is intended to include a plural representation unless the context clearly indicates otherwise.

In the following description, even if an embodiment is described with reference to a specific figure, if necessary, reference numeral not shown in the specific figure may be referred to, and reference numeral not shown in the specific figure is used when the reference numeral is shown in the other figures.

Referring to FIG. 1, the components of a speaker assembly 1 may be arranged with respect to a vertical line VV' parallel to an up-and-down or vertical direction. Meanwhile, the speaker assembly 1 may be referred to as a speaker unit, an active speaker unit, an active loudspeaker, or an active driver.

The speaker assembly 1 may include an upper basket 10, a lower basket 20, and a diaphragm 18. The upper basket 10 may be spaced upward from the lower basket 20. The upper basket 10 and the lower basket 20 may each have an overall ring shape. An outer diameter D1 of the upper basket 10 may be less than an outer diameter D2 of the lower basket 20. The diaphragm 18 may be disposed between the upper basket 10 and the lower basket 20. For example, a height of the diaphragm 18 may be substantially equal to or less than a distance H2 between the upper basket 10 and the lower basket 20. The diaphragm 18 may provide sound in a direction intersecting a height direction of the diaphragm 18. This will be described in detail later.

Meanwhile, the upper basket 10 may be referred to as an upper housing or an upper frame. The lower basket 20 may be referred to as a lower housing or a lower frame.

Referring to FIGS. 1 and 2, the speaker assembly 1 may include a first plate 11*a*, a pole piece 11*b*, a second plate 12, a magnet 13, a bobbin 14, a tinsel wire 15, terminals 15*a* and 15*b*, a coil 16, a spider 17, and the diaphragm 18.

The first plate 11*a* may define a top surface of the speaker assembly 1. The first plate 11*a* may have an overall ring shape. The first plate 11*a* may be referred to as a bottom plate. The pole piece 11*b* may protrude downward from a central portion of the first plate 11*a*. The pole piece 11*b* may have an overall hollow cylinder shape. For example, the first plate 11*a* and the pole piece 11*b* may be formed as one body. In this case, the first plate 11*a* and the pole piece 11*b* may be collectively referred to as a pole piece 11.

The second plate 12 may be spaced downward from the first plate 11*a*. The second plate 12 may have an overall ring shape. A portion of the pole piece 11*b* may pass through the second plate 12. An air gap (no reference numeral) may be formed between the second plate 12 and the pole piece 11*b*. The second plate 12 may be positioned on the upper basket 10. The second plate 12 may be referred to as a top plate.

The magnet 13 may be disposed between the first plate 11*a* and the top plate 12. The magnet 13 may have an overall ring shape. A portion of the pole piece 11*b* may pass through the magnet 13. The bobbin 14 may be positioned in the air gap, and may have a cylindrical shape elongated vertically. The coil 16 may be wound around an outer circumferential surface of the bobbin 14. The coil 16 may be referred to as a voice coil. The terminals 15*a* and 15*b* and the tinsel wire 15 may transfer electrical energy output from an amplifier (not shown) to the coil 16. Here, the terminals 15*a* and 15*b* may pass through the upper basket 10.

The spider 17 may have elasticity. The spider 17 may be disposed between the bobbin 14 and the upper basket 10. A first end of the spider 17 may be fixed or secured to the outer circumferential surface of the bobbin 14, and a second end of the spider 17 may be fixed inside the upper basket 10. The spider 17 may support the bobbin 14. The spider 17 may be referred to as a damper.

The diaphragm 18 may be elongated in the vertical direction, and may have an overall cone shape. The diaphragm 18 may be referred to as a conical diaphragm. A surface of the diaphragm 18 may form an acute angle (theta) with respect to the vertical line VV'. The diaphragm 18 may gradually increase in width from an upper end to a lower end of the diaphragm 18 (i.e., gradually increase in width from top to bottom). A diameter of the upper end of the diaphragm 18 may be less than the outer diameter D1 of the upper basket 10, and a diameter of the lower end of the diaphragm 18 may be less than the outer diameter D2 of the lower basket 20. The upper end of the diaphragm 18 may be fixed to the outer circumferential surface of the bobbin 14.

Referring to FIGS. 3 and 4, the speaker assembly 1 may include a surround 19. The surround 19 may be disposed between the lower end of the diaphragm 18 and the lower basket 20. A first end of the surround 19 may be fixed to the lower end of the diaphragm 18, and a second end of the surround 19 may be fixed inside the lower basket 20. The surround 19 may support the diaphragm 18. For example, the surround 19 and the diaphragm 18 may be formed as one body. The surround 19 may be referred to as an edge.

Meanwhile, the speaker assembly 1 may include a supporter 30. A portion of the supporter 30 may be positioned inside the bobbin 14. The supporter 30 may include a body 31 and a seating portion 32.

The body 31 may be elongated in the vertical direction. A central axis of the body 31 may be located on the vertical line VV' (see FIG. 1). The body 31 may be open at top and bottom. That is, the body 31 may have a hollow cylinder shape, and an inner space 30*a* of the body 31 may be elongated in the vertical direction.

The seating portion 32 may protrude from an outer circumferential surface of the body 31 to an outside of the body 31. The seating portion 32 may extend along a circumferential direction of the body 31. That is, the seating portion 32 may have a ring shape. An outer diameter D4 of the seating portion 32 may be greater than an outer diameter D3 of the body 31. The seating portion 32 may be located closer to an upper end of the body 31 than a lower end of the body 31. A height H4 of the seating portion 32 relative to the lower end of the body 31 may be less than a height H3 of the body 31. For example, a groove 32*g* may be formed on the seating portion 32. The seating portion 32 may be referred to as a protruding portion or a support portion.

In addition, a portion of the body 31 may be positioned inside the pole piece 11*b*, and the pole piece 11*b* may be coupled or bonded to the body 31. For example, the pole piece 11*b* may be seated on the seating portion 32. The pole piece 11*b* may surround a portion of the body 31 positioned above the seating portion 32. In other words, the pole piece 11*b* may extend along an outer circumferential surface of the portion of the body 31. For example, an inner diameter of the pole piece 11*b* may be substantially equal to the outer diameter D3 of the body 31. For example, a portion of the pole piece 11*b* may define a lower end of the pole piece 11*b*, and may surround at least a portion of the seating portion 32. For example, a protrusion (see 11*bb* of FIG. 2) may protrude downward from the lower end of the pole piece 11*b* and may be inserted into the groove 32*g* of the seating portion 32. Accordingly, the pole piece 11*b* may be more securely coupled to the seating portion 32.

Meanwhile, the lower basket 20 may include a first part 21 and a second part 22. The first part 21 and the second part 22 may be formed as one body. The first part 21 may define the outer diameter D2 (see FIG. 1) of the lower basket 20. The second part 22 may be formed by being recessed downward from the first part 21. A plurality of holes 22*a* may be formed through the second part 22 in the vertical direction, and may be spaced apart from each other in a circumferential direction of the second part 22. Accordingly, air inside the diaphragm 18 may pass through the plurality of holes 22*a*, and an extended bass reproduction range of the speaker assembly 1 may be obtained.

A lower hole 20*a* may be formed through a central portion 23 of the second part 22 in the vertical direction, and may communicate with the inner space 30*a* of the supporter 30. A protruding portion 24 may protrude upward from the central portion 23 by a predetermined length H5. Here, an end of the central portion 23 may define the lower hole 20*a*, and an inside of the protruding portion 24 may be spaced apart from the end of the central portion 23 in a radial direction of the second part 22 by a predetermined interval a. For example, the interval a may be substantially equal to or greater than a thickness of the body 31.

The lower end of the body 31 may be coupled or bonded to the second part 22. For example, the lower end of the body 31 may be seated on the central portion 23, and the protruding portion 24 may surround a portion of the body 31. In other words, the protruding portion 24 may extend along an outer circumferential surface of the portion of the body 31. For example, an inner diameter of the protruding portion 24 may be substantially equal to the outer diameter D3 of the body 31.

In addition, the magnet 13 may be coupled or bonded to the bottom of the first plate 11*a*. The second plate 12 may be coupled or bonded to the bottom of the first plate 11*a*. The upper basket 10 may be coupled or bonded to the bottom of the second plate 12.

Accordingly, the supporter 30 may support the components of the speaker assembly 1 on the second part 22 of the lower basket 20. In this case, as the supporter 30 is disposed inside the diaphragm 18, interference with sound radiation of the diaphragm 18 or a decrease in radiation efficiency may be minimized.

Meanwhile, a magnetic line of force by the magnet 13 may be formed in the air gap, and when current flows through the coil 16, a Lorentz force may be generated. The magnitude of the Lorentz force may be proportional to the magnitude of the magnetic line of force (magnetic flux density), the amount of current and the length of the wound coil, and the direction of the force may be directed in a direction perpendicular to a plane formed by the magnetic flux density and the current. The diaphragm 18 may vibrate in the vertical direction, and the speaker assembly 1 may have an omnidirectional characteristic capable of outputting sound at 360 degrees in the horizontal direction.

Referring to FIGS. 5 to 7, a light source 40, 50 may be adjacent to an upper end and/or a lower end of the supporter 30, and may provide light to the inner space 30*a* of the supporter 30. For example, the light source 40, 50 may be a light emitting diode (LED) chip or an LED package. For example, the light source 40, 50 may be a colored LED, which emits light of at least one of red, green, and blue, or a white LED. The colored LED may include at least one of a red LED, a green LED, and a blue LED. For example, the light source 40, 50 may be a chip-on-board (COB) type. The COB type, which is a type in which the light source (40, 50) is coupled directly to a substrate (41, 51), may simplify the manufacturing process, and may lower resistance to thereby reduce energy loss. Further, the COB type may be advantageous to increase brightness and provide a thin and lightweight profile.

The supporter 30 may include a light transmitting material. For example, the supporter 30 may diffuse light. For example, the supporter 30 may include a diffusion plate, and the diffusion plate may extend along a circumferential direction of the supporter 30. As another example, the supporter 30 and the diffusion plate may be formed as one body. In this case, the supporter 30 may include a light diffusing material.

The diaphragm 18 may be spaced apart from the supporter 30 in a radial direction of the supporter 30. A space between the supporter 30 and the diaphragm 18 may serve as a buffer that spreads light widely. The diaphragm 18 may include a light transmitting material. For example, the diaphragm 18 may be formed by thin-wall ultra high-speed injection molding. For example, the diaphragm 18 may have a thickness about 0.3 mm.

Referring to FIG. 5, a first substrate 41 may be inserted into an upper hole 111 of the first plate 11*a*, and may be in contact with the upper end of the supporter 30. Here, the upper hole 111 may be formed through the central portion of the first plate 11*a* in the vertical direction, and may communicate with the inner space 30*a* of the supporter 30. The upper hole 111 may be aligned with the lower hole 20*a* along the vertical line VV' (see FIG. 1). A first light source 40 may be mounted on a lower surface of the first substrate 41, and may provide light to the inner space 30*a* of the supporter 30. The first substrate 41 may be referred to as an upper shield.

Accordingly, light of the first light source 40 may spread outward through the supporter 30 and the diaphragm 18. In addition, the first substrate 41 may minimize light of the first light source 40 from spreading to the top of the supporter 30. For example, a lower shield (not shown) may be provided at the lower end of the supporter 30, thereby minimizing light of the first light source 40 from spreading to the bottom of the supporter 30. As another example, the upper end of the supporter 30 may be open, while the lower end of the supporter 30 may be closed.

Referring to FIG. 6, a second substrate 51 may be in contact with a lower surface of the second part 22 of the lower basket 20, and may cover the bottom of the lower hole 20*a*. A second light source 50 may be mounted on an upper surface of the second substrate 51, and may provide light to the inner space 30*a* of the supporter 30. Meanwhile, in some embodiments, the second substrate 51 may be disposed between the central portion 23 of the second part 22 and the lower end of the supporter 30, and may cover the top of the lower hole 20*a* (see FIG. 7). The second substrate 51 may be referred to as a lower shield.

Accordingly, light of the second light source 50 may spread outward through the supporter 30 and the diaphragm 18. In addition, the second substrate 51 may minimize light of the second light source 50 from spreading to the bottom of the supporter 30. For example, an upper shield (not shown) may be provided at the upper end of the supporter 30, thereby minimizing light of the second light source 50 from spreading to the top of the supporter 30. As another example, the lower end of the supporter 30 may be open, while the upper end of the supporter 30 may be closed.

Referring to FIG. 7, a first substrate 41 may cover the top of the inner space 30*a* of the supporter 30, and a second substrate 52 may cover the bottom of the inner space 30*a* of the supporter 30. The second substrate 52 may be disposed between the central portion 23 of the second part 22 and the lower end of the supporter 30 (see FIG. 7), or may be in contact with the lower surface of the second part 22 (see FIG. 6). The first light source 40 may be mounted on a surface of the first substrate 41 that faces the inner space 30*a* of the supporter 30, and the second light source 50 may be mounted on a surface of the second substrate 51 that faces the inner space 30*a* of the supporter 30.

Accordingly, light of the first light source 40 and light of the second light source 50 may spread outward through the supporter 30 and the diaphragm 18. In addition, due to the first substrate 41 and the second substrate 51, it is possible to minimize light of the first light source 40 and light of the second light source 50 from spreading to the top and the bottom of the supporter 30.

According to an aspect of the present disclosure, there is provided a speaker assembly including: a supporter that is elongated; an upper basket adjacent to one end of the supporter and coupled to the supporter; a lower basket adjacent to the other end of the supporter and coupled to the supporter; and a diaphragm disposed at an outside of the supporter between the upper basket and the lower basket, wherein one end and the other end of the diaphragm are coupled to the upper basket and the lower basket, respectively, so as to vibrate in a longitudinal direction of the supporter.

According to another aspect of the present disclosure, the diaphragm may have a cone shape, and may provide sound in a direction intersecting the longitudinal direction of the supporter.

According to another aspect of the present disclosure, the speaker assembly may further include a pole piece which is positioned above the upper basket, which is coupled to the upper basket, and through which a portion of the supporter passes, the supporter may further include a seating portion protruding from the supporter and on which the pole piece is seated.

According to another aspect of the present disclosure, an inner diameter of the pole piece may be substantially equal to an outer diameter of the supporter.

According to another aspect of the present disclosure, the seating portion may include a groove formed on the seating portion. The pole piece may include a protrusion that protrudes from the pole piece toward the groove and which is inserted into the groove.

According to another aspect of the present disclosure, the lower basket may include a protruding portion which protrudes from a central portion of the lower basket toward the upper basket, and which is in contact with an outer surface of the supporter, the other end of the supporter may be seated on the central portion of the lower basket.

According to another aspect of the present disclosure, the speaker assembly may further include: a top plate through which a portion of the pole piece passes and which is coupled onto the upper basket; a magnet through which a portion of the pole piece passes, which is coupled onto the top plate, and which is coupled to one side of the pole piece; a bobbin disposed between the pole piece and the top plate and extending in the longitudinal direction of the supporter, the bobbin to which the one end of the diaphragm is coupled; a spider coupled to the bobbin and the upper basket, between the bobbin and the upper basket; and a surround coupled to the other end of the diaphragm and the lower basket, between the other end of the diaphragm and the lower basket.

According to another aspect of the present disclosure, the speaker assembly may further include a light source adjacent to at least one of the one end and the other end of the supporter, and providing light to an inner space of the supporter, the supporter and the diaphragm may each include a light transmitting material.

According to another aspect of the present disclosure, the supporter may include a light diffusing material.

According to another aspect of the present disclosure, the one end of the supporter may be open, the speaker assembly may further include a first substrate to cover the one end of the supporter, the light source may include a first light source mounted on a surface of the first substrate that faces the inner space of the supporter.

According to another aspect of the present disclosure, the other end of the supporter may be open, the speaker assembly may further include a second substrate to cover the other end of the supporter, the light source may include a second light source mounted on a surface of the second substrate that faces the inner space of the supporter.

According to another aspect of the present disclosure, the supporter may be elongated in a up-down direction, and may be open upward and downward. The speaker assembly may further include: a first substrate to cover an upper end of the supporter; and a second substrate to cover a lower end of the supporter. The light source may include: a first light source mounted on a lower surface of the first substrate; and a second light source mounted on an upper surface of the second substrate.

According to another aspect of the present disclosure, the lower basket may include a plurality of holes formed through the lower basket and through which air inside the diaphragm passes.

Certain embodiments or other embodiments of the invention described above are not mutually exclusive or distinct from each other. Any or all elements of the embodiments of the invention described above may be combined or combined with each other in configuration or function.

For example, a configuration “A” described in one embodiment of the invention and the drawings, and a configuration “B” described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A speaker assembly comprising:

a supporter that extends along a longitudinal direction;

an upper basket adjacent to an end of the supporter and coupled to the supporter;

a lower basket adjacent to an opposite end of the supporter and coupled to the supporter;

a diaphragm disposed outside of the supporter between the upper basket and the lower basket; and a pole piece positioned above the upper basket and coupled to the upper basket, wherein a portion of the supporter passes through the pole piece, wherein an end of the diaphragm and an opposite end of the diaphragm are coupled to the upper basket and the lower basket, respectively, so as to vibrate in the longitudinal direction of the supporter, wherein the supporter comprises a protruding seating portion on which the pole piece is seated, and which has a groove, and wherein the pole piece comprises a protrusion that protrudes toward the groove and which is inserted into the groove.

2. The speaker assembly of claim 1, wherein the diaphragm has a cone shape and is configured to provide sound in a direction intersecting the longitudinal direction of the supporter.

3. The speaker assembly of claim 1, wherein an inner diameter of the pole piece is substantially equal to an outer diameter of the supporter.

4. The speaker assembly of claim 1, wherein the lower basket comprises a protruding portion which protrudes from a central portion of the lower basket toward the upper basket, and which is in contact with an outer surface of the supporter, and wherein the opposite end of the supporter is seated on the central portion of the lower basket.

5. The speaker assembly of claim 4, further comprising:

a top plate through which a first portion of the pole piece passes and which is coupled to the upper basket;

a magnet through which a second portion of the pole piece passes, which is coupled to the top plate, and which is coupled to a side of the pole piece;

a bobbin disposed between the pole piece and the top plate and extending along the longitudinal direction of the supporter, wherein the end of the diaphragm is coupled to the bobbin;

a spider coupled to the bobbin and the upper basket and disposed between the bobbin and the upper basket; and a surround coupled to the opposite end of the diaphragm and the lower basket and disposed between the opposite end of the diaphragm and the lower basket.

6. The speaker assembly of claim 1, further comprising a light source adjacent to at least one of the end of the supporter or the opposite end of the supporter, and configured to provide light to an inner space of the supporter, wherein each of the supporter and the diaphragm comprises a light transmitting material.

7. The speaker assembly of claim 6, wherein the supporter further comprises a light diffusing material.

8. The speaker assembly of claim 6, wherein the end of the supporter is open, wherein the speaker assembly further comprises a substrate to cover the end of the supporter, and wherein the light source comprises a first light source mounted on a surface of the substrate that faces the inner space of the supporter.

9. The speaker assembly of claim 6, wherein the opposite end of the supporter is open, wherein the speaker assembly further comprises a substrate to cover the opposite end of the supporter, and wherein the light source comprises a first light source mounted on a surface of the substrate that faces the inner space of the supporter.

10. The speaker assembly of claim 6, wherein the longitudinal direction corresponds to an up-down direction such that the end of the supporter corresponds to an upper end of the supporter and the opposite end of the supporter corresponds to a lower end of the supporter, wherein the supporter is open upward and downward, wherein the speaker assembly further comprises:

a first substrate to cover the upper end of the supporter; and a second substrate to cover the lower end of the supporter, and wherein the light source comprises:

a first light source mounted on a lower surface of the first substrate; and a second light source mounted on an upper surface of the second substrate.

11. The speaker assembly of claim 1, wherein the lower basket has a plurality of holes through which air inside the diaphragm passes.

12. A speaker assembly comprising:

a supporter that extends along a longitudinal direction;

an upper basket adjacent to an end of the supporter and coupled to the supporter;

a lower basket adjacent to an opposite end of the supporter and coupled to the supporter;

a diaphragm disposed outside of the supporter between the upper basket and the lower basket; and a pole piece positioned above the upper basket and coupled to the upper basket, wherein a portion of the supporter passes through the pole piece, wherein an end of the diaphragm and an opposite end of the diaphragm are coupled to the upper basket and the lower basket, respectively, so as to vibrate in the longitudinal direction of the supporter, wherein the supporter comprises a protruding seating portion on which the pole piece is seated, wherein the lower basket comprises a protruding portion which protrudes from a central portion of the lower basket toward the upper basket, and which is in contact with an outer surface of the supporter, and wherein the opposite end of the supporter is seated on the central portion of the lower basket.

13. The speaker assembly of claim 12, further comprising:

a top plate through which a first portion of the pole piece passes and which is coupled to the upper basket;

a magnet through which a second portion of the pole piece passes, which is coupled to the top plate, and which is coupled to a side of the pole piece;

a bobbin disposed between the pole piece and the top plate and extending along the longitudinal direction of the supporter, wherein the end of the diaphragm is coupled to the bobbin;

a spider coupled to the bobbin and the upper basket and disposed between the bobbin and the upper basket; and a surround coupled to the opposite end of the diaphragm and the lower basket and disposed between the opposite end of the diaphragm and the lower basket.

14. A speaker assembly comprising:

a supporter that extends along a longitudinal direction;

an upper basket adjacent to an end of the supporter and coupled to the supporter;

a lower basket adjacent to an opposite end of the supporter and coupled to the supporter;

a diaphragm disposed outside of the supporter between the upper basket and the lower basket; and a light source adjacent to at least one of the end of the supporter or the opposite end of the supporter, and configured to provide light to an inner space of the supporter, wherein an end of the diaphragm and an opposite end of the diaphragm are coupled to the upper basket and the lower basket, respectively, so as to vibrate in the longitudinal direction of the supporter, and wherein the light provided to the inner space of the supporter passes through the supporter and the diaphragm and spreads outward from the diaphragm.

* * * * *